A. W. LIVINGSTON.
VEHICLE WHEEL.
APPLICATION FILED SEPT. 15, 1913.

1,122,515.

Patented Dec. 29, 1914.
2 SHEETS—SHEET 1.

WITNESSES:
Frank H Carter
H. A. Stock

INVENTOR
Andrew W. Livingston
BY
Harry C Schroeder
ATTORNEY

A. W. LIVINGSTON.
VEHICLE WHEEL.
APPLICATION FILED SEPT. 15, 1913.
1,122,515.
Patented Dec. 29, 1914.
2 SHEETS—SHEET 2.
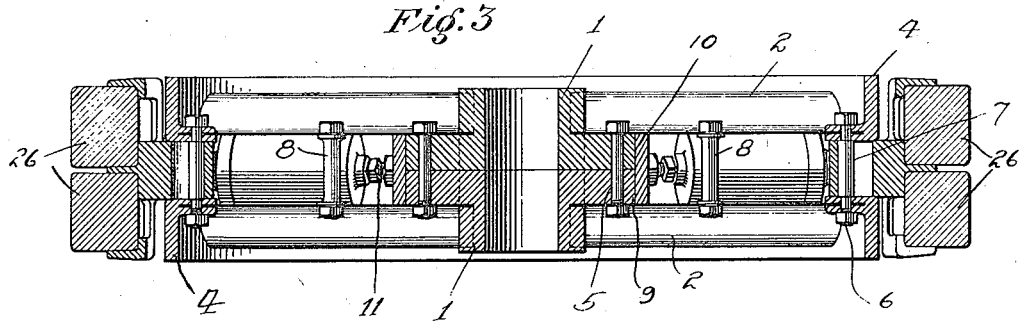
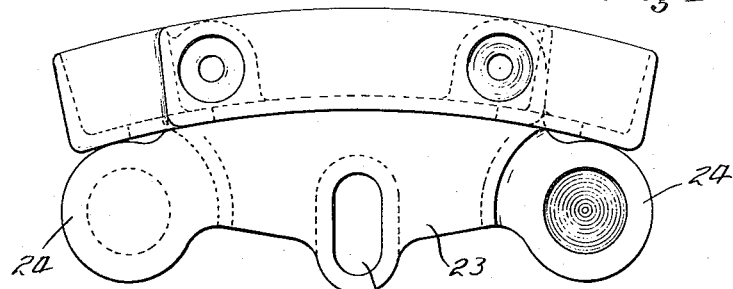
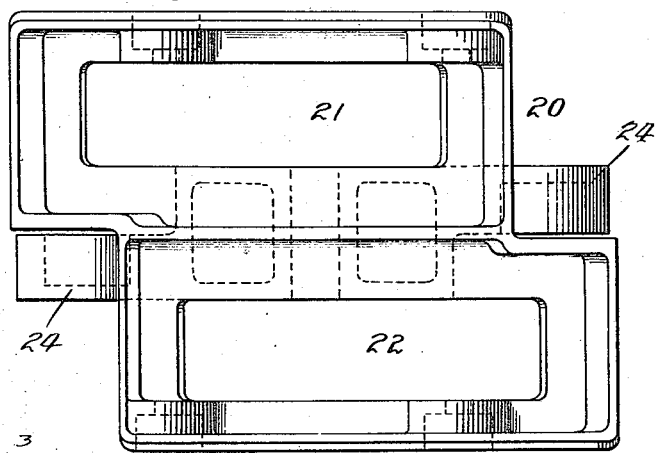
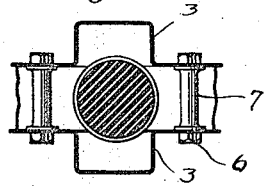
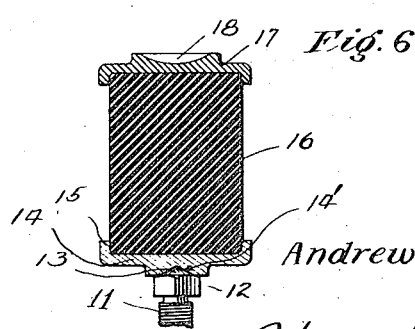
WITNESSES:
INVENTOR
Andrew W. Livingston
BY
Harry C. Schroeder
ATTORNEY

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

VEHICLE-WHEEL.

1,122,515.  Specification of Letters Patent.  Patented Dec. 29, 1914.

Application filed September 15, 1913. Serial No. 789,744.

*To all whom it may concern:*

Be it known that I, ANDREW W. LIVINGSTON, a citizen of the United States, residing at Oakland, in the county of Alameda and State of California, have invented certain new and useful Improvements in Vehicle-Wheels, of which the following is a specification.

This invention relates to improvements in resilient vehicle wheels with special reference to a wheel for automobile trucks.

The principal object of my invention is to provide a strong rugged wheel having resiliency as great as the present rubber tire truck wheels, at the same time providing a tread which is cheap to renew and which provides an antiskid surface.

With these and other objects in view my invention consists in the new and novel construction and arrangement of parts as herein described and illustrated in the accompanying drawings and as more particularly pointed out in the annexed claims.

Figure 1:
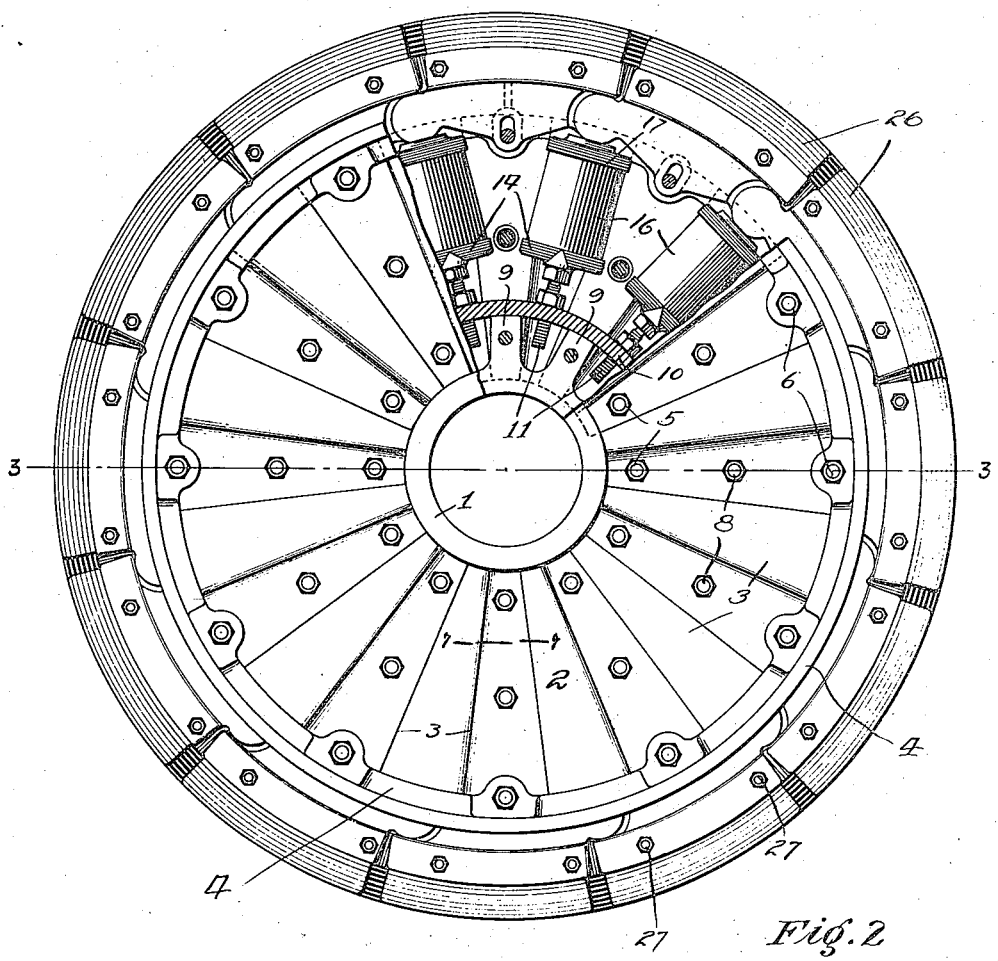
Figure 2:
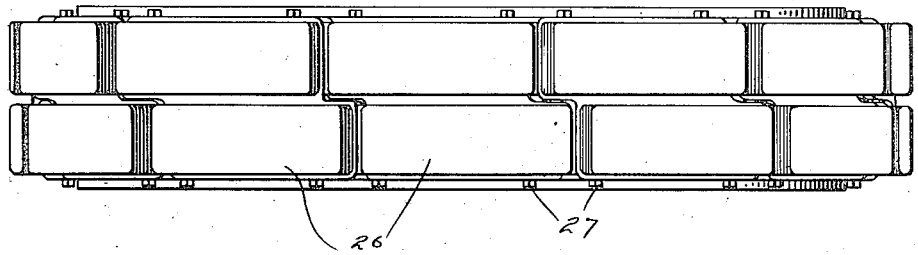

For a full comprehension of the device reference should be had to the attached drawings wherein, Figure 1 is a view in side elevation of the improved wheel with a portion broken away to show the resilient supporting means. Fig. 2 is a top plan view of the same showing the form of tread used. Fig. 3 is a view in cross section along the line 3—3 Fig. 1. Fig. 4 is a view in side elevation of one of the tread supporting members. Fig. 5 is a top plan view of the same. Fig. 6 is a longitudinal view in section through the resilient supporting means. Fig. 7 is a fragmentary sectional view on 7—7 Fig. 1.

Denoting corresponding parts by the same numerals of reference in the several views, the central portion of this wheel is composed of two similar portions each consisting of a central hub 1 into which is cast a disk 2 having the radial corrugations 3. On the outside periphery of this disk is cast an annular rim 4 of L section; this rim and the hub being finished and held together by bolts 5 and 6, the latter of which is provided with a spacing sleeve 7. Intermediate the length of the corrugations are other bolts 8 which are also provided with spacing sleeves.

The hub members 1 are provided with radial extending fingers 9 on the periphery of which is supported a ring 10 having threaded holes for the adjusting screws 11. This screw is provided with a head 12 having a conical or ball shaped point 13 thereon which fits within a similarly shaped socket 14 in a disk 14'. This disk is provided with an annular upturned flange 15 providing a seat for the resilient material 16. While I have shown this as a cylindrical block of soft rubber any other resilient means may be used. A similarly shaped disk 17 is provided on the opposite end of this block which is provided with a cylindrical socket 18. Supported on adjacent disks is the irregularly shaped tread carrying member denoted in general by 20 composed of two integral substantially rectangular hollow frames 21 and 22 in staggered relation to each other. These members are curved to the arc of the wheel diameter and provided on the under side with a longitudinal rib 23 having a width equal to the spacing between the members 4. On each end of this rib is a cylindrical lug 24 half the width thereof and adapted to rest in the socket, the lugs being oppositely disposed so that the lugs of adjacent members fit together in the same socket 18. At the center of the rib is a slot 25 which fits over the sleeve thereby limiting the outward movement of 20 by the compression of resilient means 16.

In the hollow frames 21 and 22 are bolted blocks 26 which I prefer to make of wood having the grain running in a radial direction. These blocks are held by bolts 27 passing through both frames so that they may be easily renewed.

In assembling the ring 10 is placed over the finger 9 of one central disk the other half then bolted in place. The members 20 are then forced in position so as to give the resilient means 16 an initial compression and held by bolts 6, the amount of compression being regulated by screws 11. In use as the wheel rolls along the ground the lower blocks 16 are compressed, the upper ones extended and the side ones are slightly flexed. The compression at the bottom of the wheel causes the inward movement of members 20 and a slight rolling movement of lugs 24 in the sockets 18.

By placing the blocks 26 in staggered relation a substantially cylindrical surface is obtained and the weight distributed over a greater number of blocks 16.

While I have shown the preferred embodiment of the invention it will of course be understood that changes may be made in design and details of construction without departing from the spirit thereof and that I claim such modifications as are included within the scope of the attached claims.

What I claim is:—

1. A vehicle wheel of the character described comprising, a hub, radial resilient members carried by said hub, sockets on the outer ends of said members, suitably supported annular rims, having a channel therebetween, a plurality of circumferentially disposed tread carrying members held in said channel and supported in sockets of said resilient members, said tread carrying members being formed of two parallel rectangular frames and a central supporting rib, said frames being in staggered relation and provided with means for securing tread blocks therein.

2. A vehicle wheel of the character described comprising, a hub, radially corrugate disks cast therein, annular rims cast on the periphery of said disks, spacing bars between said rims holding same in fixed relation, radial resilient members carried by said hub between said disks, and having sockets on the ends thereof, a plurality of tread carrying members disposed around the said rim members, a central rib on said members adapted to fit between said annular rims, lugs on the ends of said rib, said lugs being oppositely disposed so as to be in overlapping relation with a lug of the adjacent member, said overlapping lugs being supported in socket of resilient member, a slot in said rib adapted to retain the said member on the said spacing bars, substantially rectangular staggered frames formed on said tread members and tread blocks bolted in said frames substantially as and for the purpose described.

In testimony whereof I affix my signature in presence of two witnesses.

ANDREW W. LIVINGSTON.

Witnesses:
R. M. OYARZO,
J. M. BENHAM.